Figure 1:
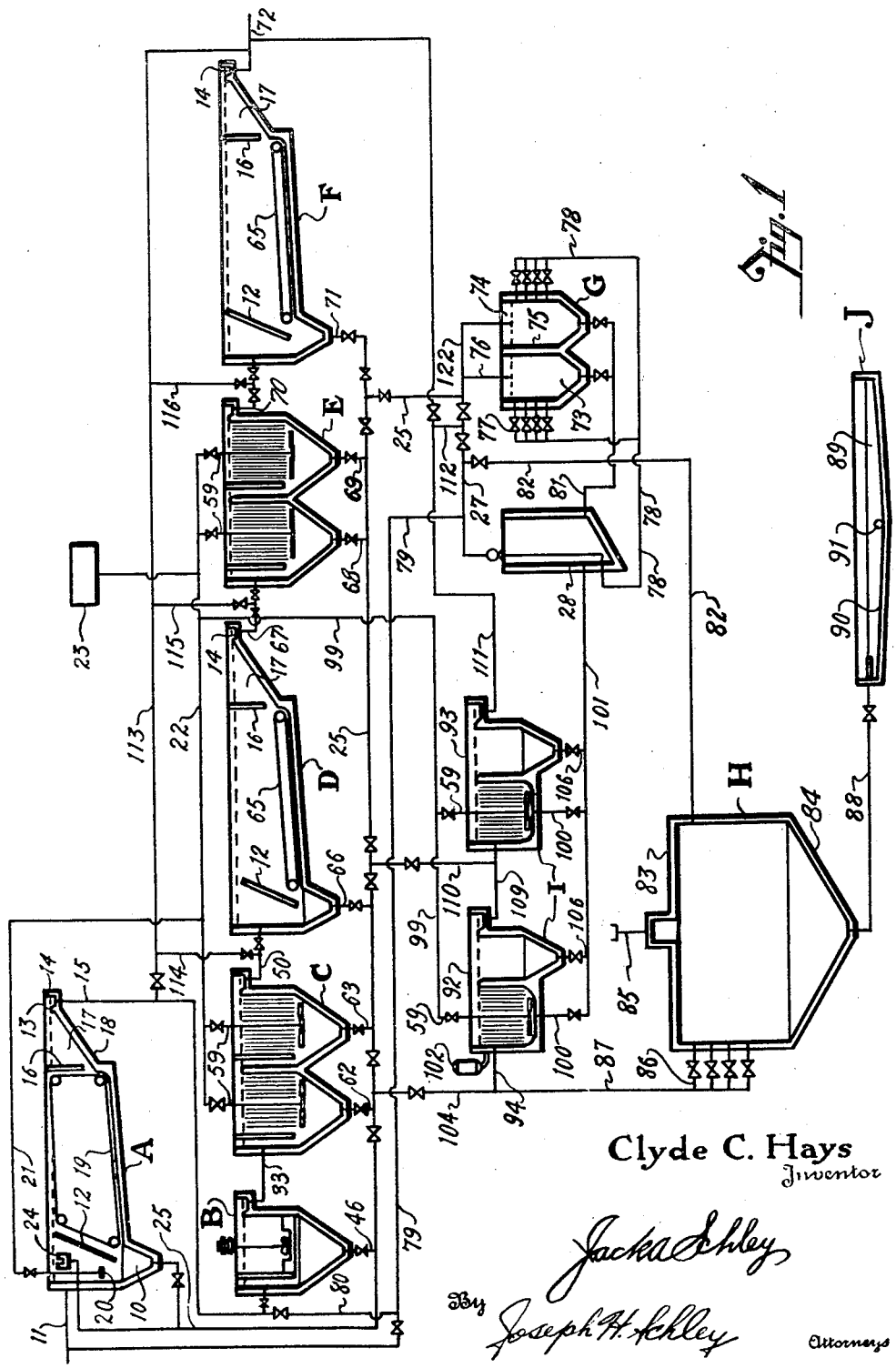

Jan. 4, 1949.    C. C. HAYS    2,458,163
SEWAGE TREATING PROCESS
Filed April 6, 1944    3 Sheets-Sheet 1

Clyde C. Hays
Inventor
By Jack A. Schley
Joseph H. Schley
Attorneys

Jan. 4, 1949.   C. C. HAYS   2,458,163
SEWAGE TREATING PROCESS
Filed April 6, 1944   3 Sheets-Sheet 2

Clyde C. Hays, Inventor

By Jack A. Schley
Joseph H. Schley
Attorneys

Jan. 4, 1949.    C. C. HAYS    2,458,163
SEWAGE TREATING PROCESS
Filed April 6, 1944    3 Sheets-Sheet 3

Clyde C. Hays
Inventor

Patented Jan. 4, 1949

2,458,163

UNITED STATES PATENT OFFICE 2,458,163

SEWAGE TREATING PROCESS

Clyde C. Hays, Waco, Tex.

Application April 6, 1944, Serial No. 529,733

3 Claims. (Cl. 210—2)

This invention relates to new and useful improvements in sewage treating processes.

Many processes have been conceived for the treatment of sewage and industrial or other analogous waste by aerobic means, the coagulated and precipitated solids or sludge being collected and digested septically or anaerobically so as to break up the various organic substances into solids, gases and an exceptionally toxic, unstable, anaerobic liquid which is commonly known as supernatant. The latter, upon being returned to the aerobic process, has an extremely detrimental or fatal effect upon the aerobic bacteria or biological organisms.

One object of the invention is to provide an improved process for the thorough treating of sewage, industrial or other analogous waste so as to efficiently and completely purify the same.

An important object of the invention is to provide an improved sewage treating process wherein the solids are coagulated and precipitated out of the flow stream and then treated by anaerobic digestion, the resultant anaerobic liquid or supernatant being reduced to an aerobic condition whereby said supernatant may be returned to the flow stream without the usual detrimental effect.

A particular object of the invention is to provide an improved sewage treating process, of the character described, wherein the coagulated and precipitated solids are gathered in concentrated form for further treatment in a suitable manner.

Another object of the invention is to provide an improved treating process, of the character described, wherein the anaerobic supernatant is reduced to an aerobic condition by rejuvenating the same or raising the pH of its alkalinity through admixing alkaline material therewith and subjecting the mixture to the action of facultative and aerobic organisms activated by or in the presence of forced aeration or mechanical agitation, the aerobic organisms being previously grown upon suitable contact media in any suitable manner and being replenished by the addition of aerobic sludge.

A further object of the invention is to provide an improved sewage treating process, of the character described, wherein the sewage is pre-aerated or pre-agitated so as to facilitate subsequent settling out of suspended and colloidal solids.

Still another object of the invention is to provide an improved sewage treating system which includes a settling chamber for receiving the sewage and for settling out the solids therein, together with a contact aeration chamber which has means for coagulating and precipitating certain suspended and colloidal solids in the flow stream, as well as means for receiving and anaerobically or septically digesting the solids precipitated and settled out in the chambers; the system also including means for rendering the anaerobic supernatant aerobic whereby the same may be returned to the flow stream without the usual detrimental effect.

A still further object of the invention is to provide an improved sewage treating system having an aerobic contact unit for receiving the anaerobic supernatant from sludge digesting means and reducing the same to an aerobic condition, the unit including a contact aeration chamber wherein said supernatant is admixed with an alkaline material to raise its pH and is subjected to certain contact biological organisms, which organisms may be activated by aeration and replenished by the addition of aerobic sludge.

Another object of the invention is to provide an improved sewage treating system, of the character described, having means for collecting and concentrating all of the sludge precipitated and settled out by the system and thereby facilitate the continuous or batch treatment thereof.

A further object of the invention is to provide an improved contact chamber for use in various units of a sewage treating system which includes suitably-spaced contact media of any desired form or shape so long as it provides satisfactory surface area upon which biological organisms may attach themselves and passages for accommodating the flow of sewage, together with means for aerating the sewage so as to activate the biological organisms; the contact media being formed of inorganic compounds, of natural or artificial formation, or of organic plastics of artificial formation and preferably having means in the flow passages thereof for deflecting the flow and prolonging the aerating action.

A construction designed to carry out the invention will be hereinafter described together with other features of the invention.

Figure 2:
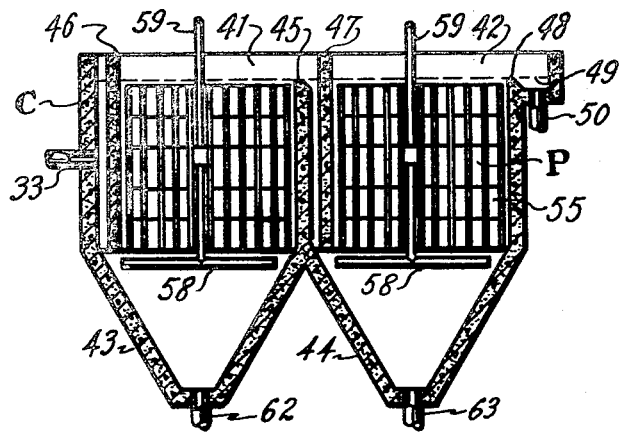
Figure 3:
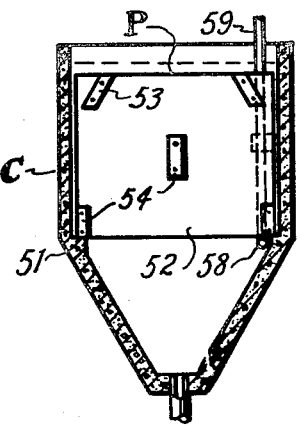
Figure 11:
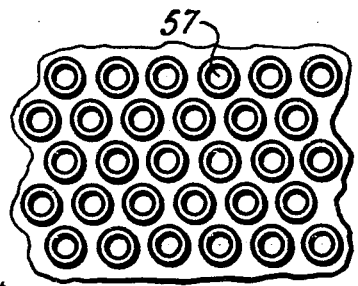
Figure 4:
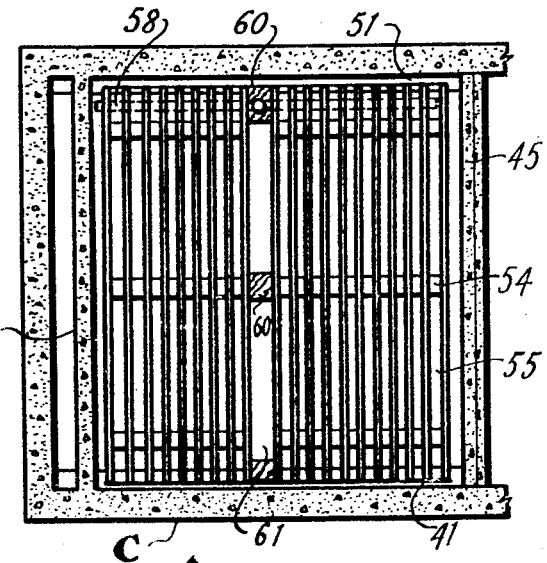
Figure 5:
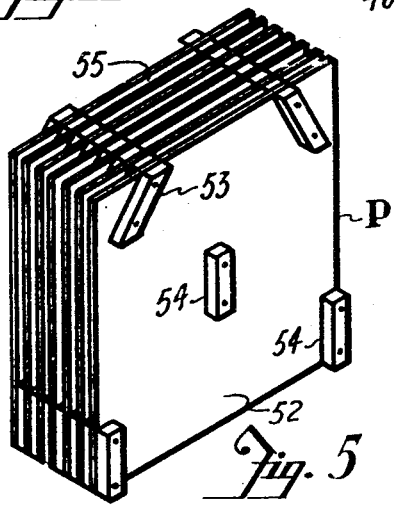
Figure 6:
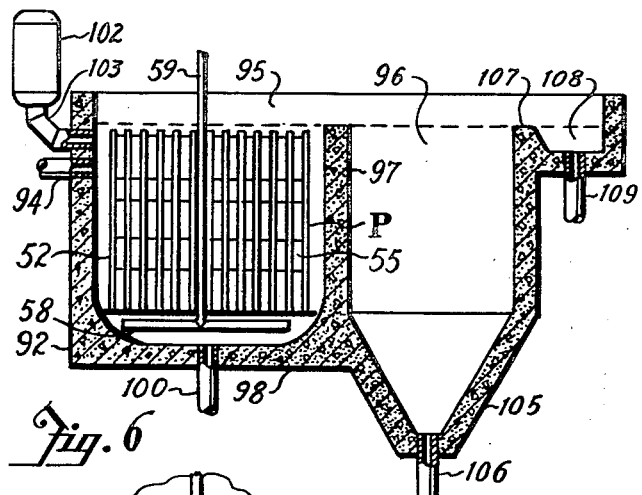
Figure 7:
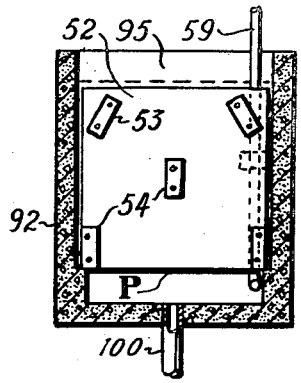
Figure 9:
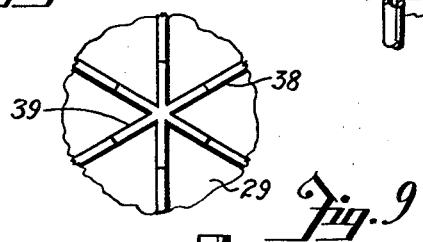
Figure 8:
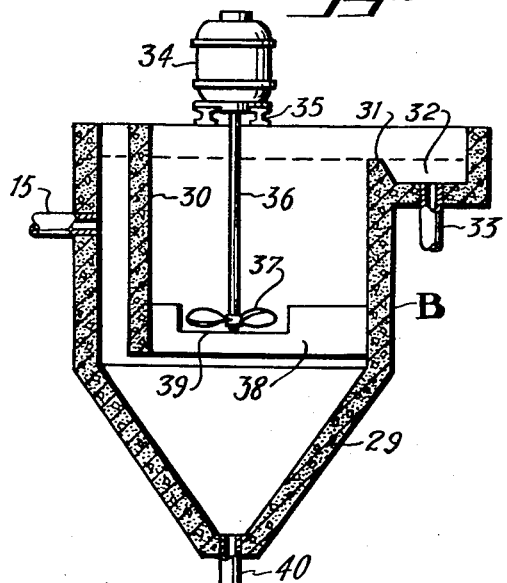
Figure 10:
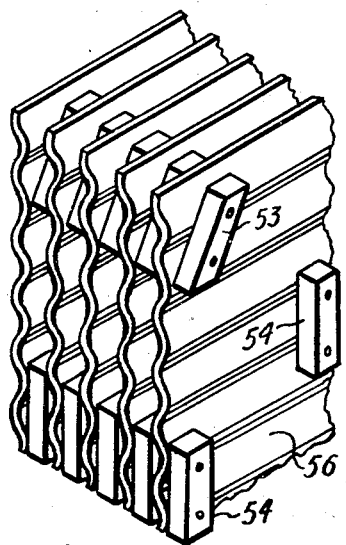

The invention will be more readily understood from a reading of the following specification and by reference to the accompanying drawings, as an example of the invention is shown, and wherein:

Figure 1 is a diagrammatic plan view of a sewage treating system, constructed in accordance with the invention, Figure 2 is an enlarged, longitudinal, vertical, sectional view of one of the contact aeration units, Figure 3 is a transverse, vertical, sectional view of one of the chambers of the contact aeration unit, Figure 4 is an enlarged plan view of the chamber shown in Figure 3, Figure 5 is an isometric view of the contact media mounted in said chamber, Figure 6 is a longitudinal, vertical, sectional view of one tank of the aerobic contact unit, Figure 7 is a transverse, vertical, sectional view of the contact aeration chamber of the tank shown in Figure 6, Figure 8 is a transverse, vertical, sectional view of the pre-aeration or pre-agitation unit, Figure 9 is a plan view of a portion of the baffles mounted in the pre-agitation unit, Figures 10 and 11 are isometric views, showing portions of modified forms of contact media.

In the drawings, the letter A designates a primary settling tank or chamber which is preferably constructed of concrete or other suitable material and which has a general rectangular shape in cross-section. The tank has an open top and its inlet end is formed with a depending hopper or reservoir 10, the hopper preferably being made integral with the bottom of the tank as shown in Figure 1. A sewage inlet pipe 11 is connected in the inlet end of the tank and an inclined, transverse deflector or baffle 12 is disposed within the interior of said tank adjacent the inlet pipe, whereby the influent strikes the deflector or baffle and falls downwardly within the tank. Due to the provision of the deflector 12, the solids in the influent which are of sufficient weight will immediately settle out of the influent so as to drop downwardly into the hopper 10. These accumulated solids will be hereinafter referred to as sludge.

The liquid level within the tank A is controlled by a weir 13 which is disposed at the end of said tank opposite the inlet pipe 11. A small outlet chamber 14 is formed beyond the weir 13 and a suitable outlet pipe 15, having a manual control valve connected therein, extends from this chamber. A transverse, vertical deflector or baffle 16 is disposed adjacent the weir so as to provide a quiescent chamber or zone 17 at the effluent end of the tank between the baffle and weir, thereby facilitating the settling of finely-divided, suspended sludge from the influent. The chamber or zone 17 is provided with an inclined bottom 18 which is preferably a continuation of the bottom of the tank for conducting the settled sludge from said zone to said tank bottom. It is noted that the baffles 12 and 16 extend entirely across the tank, being spaced from the bottom thereof and having their upper ends above the weir 13 and the liquid level but below the top of said tank. Thus, the influent under normal flowing conditions must pass beneath the baffles in order to escape from the tank A. A collector 19, of the usual construction, is mounted between the baffles 12 and 16 so as to scrap sludge from the bottom of the tank and convey it to the hopper 10.

As the influent enters the tank through the pipe 11, it is aerated by means of a suitable air nozzle or diffuser 20 which is located in the lower portion of said tank between the baffle 12 and the inlet end of the tank. An air inlet pipe 21 extends downwardly to the central portion of the nozzle or diffuser 20 and is connected to an air supply pipe 22 which, in turn, is connected to the discharge or pressure side of a suitable blower or fan 23 for supplying air to said nozzle or diffuser. This aeration of the influent causes grease and other light scum, such as lubricating oil, to float on the surface of the liquid within the tank and, in cooperation with the baffle 12, assists in settling the heavier solids or sludge directly to the hopper 10. A well 24, having a sludge discharge pipe 25 leading therefrom, is disposed between the inlet pipe 11 and baffle 12 for receiving and removing the grease and other scum from the tank as it collects upon the surface of the liquid therein. The hopper 10 also communicates with the discharge pipe 25, whereby the sludge accumulated within said hopper may be withdrawn therefrom. The opposite end of the discharge pipe which has suitable manual control valves mounted therein is connected by a line 27 to a wet well or pump 28 which serves to remove scum from the well 24 and sludge from the interior of said hopper. The effluent, which will contain certain suspended and colloidal solids, will flow from the tank A through the outlet pipe 15 so as to be conducted to a pre-aerating chamber or unit B, wherein said effluent is subjected to agitation to facilitate settling out of the suspended and colloidal solids.

Although the chamber B may be of any suitable construction, the preferred manner of constructing the same is shown in Figure 8 and is preferably of a general circular shape having a conical hopper bottom 29. A transverse, vertical baffle 30 extends across the chamber and is disposed in spaced relation to the end of the pipe 15 which extends through the wall of said chamber. The baffle extends from the top of the chamber B to a point spaced immediately above the hopper 29, whereby the influent stream entering said chamber is directed downwardly into said hopper and then flows upwardly into the main portion of the chamber. The flow is then over a weir 31, preferably diametrically opposed from the baffle 30, into a sump 32 which projects laterally from the chamber B adjacent the weir and which has an outlet pipe 33 extending from the bottom thereof. A suitable agitator is disposed axially in the main portion of the chamber B and includes a suitable motor 34 supported by cross-members 35 which span the open top of said chamber and a depending drive shaft 36 having blades 37 mounted on the lower end thereof. In order to assure agitation or aeration of all of the stream which passes through the chamber B, a plurality of transverse, vertical deflectors 38 may be disposed radially at the lower end of said chamber so as to separate the same from the hopper 29 and each deflector may be provided with a suitable recess 39 which is vertically alined with the drive shaft 36 of the agitator for receiving the blades 37. The latter are arranged to force the liquid downwardly through the recessed portions of the deflectors, whereby said liquid is thoroughly agitated or aerated to facilitate settling of the solids, and to add dissolved oxygen. From the foregoing, it will be readily apparent that the flow from the pipe 15 is brought into the chamber B and is directed downwardly around the baffle 30 into the hopper 29, being circulated by the blades 37 prior to passing upwardly into the main portion of said chamber. The flow is then over the weir 31 into the sump 32 and then outwardly through the pipe 33. As is clearly shown in Figure 1, the sludge which falls downwardly into the hopper 29 is withdrawn from said hopper by a pipe 40 having a valve therein and which is connected to the sludge discharge pipe 25.

For coagulating and precipitating the suspended and colloidal solids, a primary submerged biological contact aeration unit C is provided and is preferably constructed in the form of a general rectangular tank. As shown in Figure 2, the tank includes a pair of chambers 41 and 42 with sludge accumulating hoppers 43 and 44 disposed beneath and communicating with the chambers. A transverse, vertical partition or wall 45, having its upper end terminating short of the top of the tank, separates the chambers from each other. The pipe 33 which conducts the effluent from the chamber B extends through one wall of the chamber 41 at substantially mid-height thereof so as to communicate with and discharge said effluent into said chamber. A transverse, vertical baffle 46 extends across the chamber 41 in spaced relation to the inner end of the pipe 33, whereby the stream entering said chamber is directed downwardly into the hopper 43. The flow is then upwardly through the chamber 41 and over the upper end of the partition 45 into the chamber 42, wherein said flow is deflected downwardly into the hopper 44 by a baffle 47 which is substantially identical to the baffle 46. As is clearly shown in Figure 2, the baffles 46 and 47 extend to the top of the tank above the liquid level, whereby the flow must pass downwardly through the vertical passages or channels formed by said baffles. In the chamber 42, the flow is upwardly from the hopper 44 and over a weir 48 which is secured to the adjacent end wall of the tank. A sump 49 extends laterally of the tank adjacent the weir 48 and has an outlet pipe 50 extending therefrom. Thus, the flow from the pipe 33 is directed downwardly around the baffle 46, upwardly through the chamber 41, over the partition 45, downwardly around the baffle 47, upwardly through the chamber 42, over the weir 48 into the sump 49 and then outwardly through the pipe 50.

For coagulating and precipitating certain suspended and colloidal solids as the sewage flows through the chambers 41 and 42, each chamber is provided with a plurality of plate or baffle units P. Since the arrangement of the plate units within each chamber is the same, a description of one will suffice. For supporting each unit, suitable longitudinal shoulders or ledges 51 are formed within the lower end of each chamber along the end walls thereof (Fig. 3). Each plate unit includes a plurality of sheets or plates 52 which are maintained in spaced relation by rectangular deflectors 53 and spacer blocks 54, the plates being fastened to the spacer blocks and to each other by nails, tacks or other suitable means. The spacing of the plates 52 from each other is subject to rather wide variation and is controlled by the quantity of surface area required to support the biological organisms which are needed to effect coagulation and precipitation of the suspended and colloidal solids in the sewage stream flowing between said plates. When the plates are positioned within their respective chambers, the same are preferably disposed vertically therein so as to form a plurality of vertical flow passages or spaces 55 for accommodating the flow through the chambers.

Although the plates 52 have been shown as flat and parallel so as to form straight flow passages 55 (Figs. 2 to 5), it is manifest that corrugated plates 56 as shown in Figure 10 or cylindrical tubes 57 as shown in Figure 11 could be substituted for said flat plates. Attention is directed to the fact that the plates and tubes merely provide spaced contact media and that the shape or form of the same is not important so long as a satisfactory surface area on which biological organisms may attach themselves is provided. The material or composition of the contact media may consist of inorganic compounds, either of natural or artificial formation, or organic plastics of artificial formation, and may include cement asbestos, mineral aggregate, cement, cellulosive acetate butyrate, chemically-treated wood or other suitable material. Also, the invention is not to be limited to the particular means and method of assembling the plates as any suitable means for maintaining said plates in the required or desired spaced relation may be utilized. Of course, the contact media may be mounted within the chambers in any desired manner.

Aeration, which is necessary for the activating of the biological organisms which collect and adhere to the surface of the contact media or plates 52, is supplied through an air nozzle or porous diffuser 58 mounted within the lower portion of each chamber of the unit C below said plates. Although the nozzle or porous diffuser may be disposed in any desired position, the same is preferably located adjacent one wall of the chamber (Figs. 3 and 4). Each nozzle or porous diffuser which may be supported in any suitable manner and which is preferably formed of fused silicon, oxide aluminum or other ceramics or organic plastic tubes, extends transversely at substantially a right angle to the plates and having a plurality of fine openings. An air inlet pipe 59 extends downwardly to the medial portion of each nozzle or porous diffuser 58 and has its upper end connected to the air supply line 22. It is noted that the plates between which the air inlet pipe 59 extends are spaced a greater distance from each other as shown at 61 by means of relatively-thick spacer blocks 60, one of which surrounds said pipe so as to permit removal of said inlet pipe and its nozzle or porous diffuser upon rotating the same to aline said nozzle or porous diffuser with the space 61 (Fig. 4).

The spacer blocks 54 are positioned so as to not interfere with the flow of air from the nozzle or porous diffuser 58 upwardly through the spaces or passages 55. It is pointed out that when the blocks 54 are disposed in the path of the upwardly flowing air, the same are disposed vertically so as to present the smallest possible obstructing area or surface to said flow. As is clearly shown in Figures 3 and 5, the deflectors 53 are disposed at the upper portion of each flow passage 55 adjacent the vertical edges of the plates and at an angle or inclination. One of the deflectors 53 is disposed substantially in vertical alinement with the nozzle or porous diffuser 58 and both deflectors have their upper ends converging toward each other. Thus, the upward flow of the air through each passage 55 is deflected laterally across said passage by the overlying deflectors into engagement with the angularly-disposed deflector on the opposite side of the passage. Due to the disposition of the latter deflector, it is obvious that the air will be deflected downwardly toward the lower portion of the chamber. Thus, a rotation or whirling action in a vertical plane is imparted to the air by the deflectors 53 and such motion will be transmitted to the liquid within the chambers of the unit C. Manifestly, this rotation or whirling of the air delays the escape of the same from the liquid, whereby a greater amount of aeration is obtained from a given quantity of air and whereby the biological organisms which collect and adhere to the surfaces of the plates 52 are more thoroughly activated.

From the foregoing, it will be readily apparent that the sewage stream which flows from the tank A through the pipe 15 to the chamber B and from said chamber is introduced by the pipe 33 into the primary contact unit C at one side of the chamber 45. The flow is downwardly into the lower portion of the chamber around the baffle 46 and the heavier solids therein will immediately settle downwardly into the sludge hopper 43. The flow is then upwardly through the passages 55 between the plates 52, whereby the sewage stream is broken up into a plurality of small streams or channels with each small stream contacting the surfaces of adjacent plates. Aerobic bacteria or biological organisms will accumulate on the surfaces of the plates and the introduction of air through the nozzles or porous diffusers will activate these organisms. Manifestly, the sewage will be brought into intimate contact with the aerobic organisms on the surfaces of the plates, whereby coagulation and precipitation of the suspended and colloidal solids in the sewage will be effected. Of course, most of these solids will drop into the sludge hopper 43. After leaving the chamber 41, the flow is upwardly over the partition 45 and downwardly into the lower portion of the chamber 43 around the baffle 47. Since this chamber has the same plate unit therein, the same action will be repeated in said chamber and the solids will accumulate as sludge in the lower end of the hopper 44. As has been hereinbefore explained, the deflectors 53 will deflect the flow of air through the passages 55 of the plate units P so as to prolong the presence of the air within the sewage and thereby more thoroughly activate the biological organisms which adhere to the plates 52. The effluent escapes from the chamber 42 through the outlet pipe 50, while the sludge is withdrawn from the hoppers 43 and 44 through pipes 62 and 63 which have valves mounted therein and which are connected with the sludge discharge pipe 25 that leads to the wet well or sludge reconcentration unit 28.

Upon its discharge from the primary contact unit C, the sewage is conducted to an intermediate or secondary settling tank D. The latter is substantially identical in construction to the tank A with certain exceptions. The grease sump 24, air nozzle or diffuser 20 and line 21 are omitted, while a collector 65, having both of its flights disposed adjacent the bottom of the tank D beneath the liquid level, is substituted for the collector 19 of the tank A. Since the tank D need not handle the same volume as the primary settling tank A, the capacity of the former may be less than the latter. The outlet pipe 50, which extends from the primary contact unit C, is connected to the inlet end of the intermediate settling tank D and the sludge from the hopper 10 of said intermediate settling tank is discharged therefrom through an outlet pipe 66 having a valve therein into the sludge discharge pipe 25.

The effluent from the intermediate settling tank D is conducted from its sump 14 by a pipe 67 to a secondary submerged biological contact unit E which is identical in construction to the primary contact unit C. Within the secondary contact unit, the same action is repeated and the sludge is collected in the hoppers 43 and 44 of said unit. Suitable pipes 68 and 69, having valves therein and having connection with the sludge discharge pipe 25, conduct the sludge from the hoppers of the secondary contact unit. The effluent flows from the secondary contact unit through a pipe 70 to a third or final settling tank F which is identical to the settling tank D. The passage of the fluid through the final settling tank is the same as has been described in connection with the other settling tanks and the sludge is accumulated in the hopper 10 of said tank, whereby the same may be withdrawn through an outlet pipe 71, having a pipe therein, into the sludge discharge pipe 25. A final discharge line 72 extends from the outlet end of the final settling tank F and conducts the clear liquid therefrom.

Thus, the sewage is conducted alternately through settling tanks and contact units and is preferably mechanically agitated intermediate the primary settling tank A and contact unit C. In each tank or unit, the removal of solids is effected and the sludge is accumulated in the hoppers of the various tanks or units. All of the latter have connection with the sludge discharge pipe 25 which is connected to the suction side of the wet well or pump 28. Thus, the wet well acts to withdraw the sludge accumulation from the various hoppers and may serve to pump said sludge to a reconcentration unit G through the pipe 27 and a connecting pipe 122 both of which have valves therein. However, under ordinary circumstances, the sludge will flow by gravity from the hoppers through the sludge discharge pipe 25 and the pipe 122 directly into the reconcentration unit G.

The unit G includes an open tank, preferably constructed of concrete or other suitable material, which is divided into a pair of chambers 73 and 74 by a central, vertical partition or wall 75. Each chamber has a tapered or hopper-shaped bottom and its open upper end receives the pipe 122 or its branch 76. Within the chambers 73 and 74, the sludge from the hoppers of the various tanks and units is allowed to remain for a period of time sufficient for said sludge to separate from the water which enters said chambers therewith. After this settling of the sludge, the liquid is drawn or allowed to flow by gravity into the wet well 28 by means of a plurality of outlet pipes 77 which extend through the wall of each chamber and have suitable valves connected therein for controlling the flow from the chambers. The outlet pipes 77 are disposed at different levels to permit the withdrawal of liquid from different levels and have connection with the wet well 28 through a pipe 78 so as to permit the discharge of liquid thereinto. From the wet well, the liquid is recirculated through the entire system by a valved pipe 79 which communicates with the pipe 27 and which extends to the inlet pipe 11 leading to the primary settling tank A. A pipe 80, having a valve connected therein, establishes communication between the pipe 79 and the pipe 15 which lead from the primary settling tank A to the pre-aeration or agitating unit B, whereby the liquid from the reconcentration unit G, or a portion thereof, may be conducted directly to said unit B. The hopper-shaped bottoms of the chambers 73 and 74 of the reconcentration unit G are connected by pipes 81, having valves therein, with the wet well 28, whereby the sludge may flow or be withdrawn from said chambers into said wet well and then pumped through the pipe 27 and a communicating valve pipe 82 into a septic or anaerobic sludge digesting unit H.

The sludge digesting unit H includes a tank of concrete or other suitable material having a closed top 83 and a hopper bottom 84. An anaerobic biological action takes place within the sludge digestive unit H for reducing and separating the sludge into gases, solids and liquids, the latter being commonly known and referred to as supernatant. The separated gases are discharged through a suitable vent pipe 85 mounted in the top 83 of the unit H to a flare or other disposal means. A plurality of liquid discharge pipes 86, having manual control valves mounted therein, extend through one wall of the tank at different levels and are connected with a pipe 87 which leads to an aerobic contact unit I, whereby the liquid or supernatant may be withdrawn from said tank at different levels and conducted to the unit I.

The sludge which is finally removed from the system, that is the sludge which collects in the hopper bottom 84 of the tank or unit H, passes through a pipe 88 to a filter bed unit J. The latter is constructed in the usual manner and consists of a relatively shallow tray or vessel having filtering material, such as asbestos or sand, disposed therein. The bottom of the tray or unit J is inclined toward the center thereof as shown at 90 and a suitable discharge port 91 is located at the lowest point of this inclination to permit the escape of liquid which is filtered through the bed 89.

The aerobic biological contact unit I, to which the supernatant is conducted from the sludge digestive unit H through the pipes 86 and 87, preferably includes a pair of tanks 92 and 93, one of which is shown in detail in Figures 6 and 7. However, only one tank may be used if desired, especially in relatively small systems and depending upon the biochemical oxygen demand of the supernatant as well as the desired degree of treatment. An inlet pipe 94 connects the tank 92 to the pipe 87 and extends through one end wall thereof into a contact aeration chamber 95 which is separated from a decanting chamber 96 by a transverse, vertical partition or wall 97. The partition 97 extends from the bottom of the tank 92 to a point spaced from the top of said tank so as to control the liquid level in the chamber 95. It is pointed out that the chamber 95 is very similar to the chambers 41 and 42 of the contact aeration units C and E, with the exception of the hoppers 43 and 44 and the baffles 46 and 47. The chamber may have a substantially flat or concave bottom 98 with one or more plate units P disposed in the interior thereof, whereby the end plates 52, adjacent the inlet pipe 94 function and serve the same purpose as the baffles 46 and 47. The air nozzle or diffuser 58 is disposed within the chamber beneath the plate units P and has its air pipe 59 connected to the air line 22 by a suitable pipe 99. It is manifest that the flow from the pipe 94 is downwardly between the end wall of the tank and the adjacent end plate 52 into the bottom of the chamber 95 and then upwardly through the spaces 55 of the plate unit P and then over the partition 97 into the decanting chamber 96. The solids which precipitate and fall downwardly to the bottom of the chamber will accumulate as sludge and escape through a valved outlet pipe 100 into a sludge discharge pipe 101 which communicates with the wet well 28.

Ordinarily, the pH of the anaerobic supernatant conducted from the sludge digesting unit H to the chamber 95 is relatively low, considerably below 7.2, and is very toxic to aerobic biological growths. In order to rejuvenate the supernatant and raise its pH to an alkalinity of 7.6 or higher so as to provide a more favorable biological environment and reduce said supernatant to an aerobic condition, an alkaline material, such as alkaline aerobic biological sludge, lime, or calcium hydroxide, may be added to said supernatant prior to or at the time it enters the chamber 95 of the tank 92. A suitable feeder 102 for delivering the alkaline material to the supernatant as it enters the contact aeration chamber has its discharge pipe 103 extending through one wall of said chamber above the inlet pipe 94. The solid alkaline material is preferably admixed with water or other liquid prior to its introduction into the chamber and the solution may be kept in suspension by being agitated due to the introduction of air under pressure. However, it is pointed out that the alkaline material may be fed or added to the supernatant in a dry or powdered condition. Of course, the feeding of the alkaline material is regulated in accordance with the flow of the supernatant or its alkalinity. The diffused air or free oxygen supplied by the air nozzle or diffuser 58 also aids in the rejuvenation of the supernatant. It is also highly desirable to introduce a small quantity of alkaline aerobic biological sludge, from the primary and secondary contact aeration units C and E into the chamber 95 of the tank 92, whereby the same may be admixed with the supernatant to assist in the rejuvenation thereof. For conducting the aerobic sludge from the units C and E, a valved pipe 104 extends from the sludge discharge pipe 25 to the inlet pipe 94. Thus, by manipulating the proper valves, any desired quantity of the aerobic sludge from the units C and E may be conducted to the chamber 95 and admixed with the supernatant therein. Facultative and aerobic organisms may be grown on the contact surfaces of the plate units P prior to the introduction of the aerobic sludge into the contact unit I and this growth may be accomplished by passing the aerobic sludge from the unit C or E therethrough.

After the supernatant, the aerobic sludge and alkaline material have been admixed and aerated together within the chamber for a sufficient length of time to bring about coagulation of the organic matter suspended in said supernatant, the same, together with the coagulated solids, flow over the partition 97 into the decanting chamber 96. Within this chamber, the flow is quiescent so as to permit settling of the solids into a hopper 105 which is preferably made integral with the lower end of said chamber, said solids accumulating as sludge in the bottom of the hopper and escaping through a valved outlet pipe 106 into the sludge discharge pipe 101. A weir 107 which is located at the end of the tank 92 opposite the inlet pipe 94 controls the liquid level within the chamber 96 and has a sump 108 disposed beyond and contiguous thereto. The liquid or effluent which flows over the weir 107 into the sump 108 escapes through an outlet pipe 109 which communicates with the contact aeration chamber 95 of the second tank 93.

With the exception of the feeder 102, the tank 93 is identical to the tank 92. The aerobic sludge from the units C and E may be introduced into the tank 93 by means of a valved pipe 110 which establishes communication between the sludge discharge pipe 25 and the inlet pipe 109 of said tank. Due to the identical construction of the tank 93, the same action takes place in said tank as in the tank 92 and additional organic matter is coagulated and settled out as sludge within its chambers 95 and 96. This sludge escapes through the outlet pipes 100 and 106 and is conducted by the sludge discharge pipe 101 to the wet well 26. From the well 26, the sludge is conducted through the pipes 27 and 122 to the reconcentration unit G wherein the liquid is separated from the sludge and returned to the influent end of the primary settling tank A or the pre-aeration unit B by means of the pipes 77, 78, 27, 79 and 11 or 80. The reconcentrated solids or sludge are returned to the sludge digesting unit H, together with fresh sludge from the various units by means of the pipes 81, 27 and 82. The liquid or effluent from the tank 93, which has been reduced to an aerobic condition, flows through an outlet pipe 111 to the final effluent pipe 72. However, it is pointed out that a short pipe 112 establishes communication between the outlet pipe 111 and the pipe 27, whereby the liquid or effluent from the tank 93 may be conducted to the influent end of the primary settling unit A or the pre-aeration unit B. Also, a valved by-pass line 113 extends from the final effluent pipe 72 to each of the units or tanks B, D, E and F, being directly connected to the pipe 15 and having connection with the pipes 50, 67 and 70 through valved pipes 114, 115 and 116, respectively. Thus, a portion of the liquid may be withdrawn from the flow prior to its entering the chambers B, D, E or F.

From the foregoing, it is readily apparent that an efficient sewage treating process and system is provided. The sewage is introduced into the primary settling tank and the heavier, as well as lightest, solids are removed therefrom. Then, the sewage flows through pre-aeration unit B, wherein settling of the suspended and colloidal solids is facilitated by mechanical agitation and by added dissolved oxygen. After this, the solids in suspension are coagulated and precipitated within the contact unit C. From this point, the sewage passes through the secondary settling tank D, then through the secondary contact unit E and finally through the final settling tank F. The sludge, which is removed from all of the tanks and units, is conducted to the reconcentration unit G and then to the digesting unit H. The liquid, separated from the sludge in the sludge reconcentration unit, is recirculated through the system by being conducted either to the primary settling tank A or pre-aeration unit B. From the sludge digesting unit, the sludge passes to the filter unit J and the anaerobic liquid or supernatant flows to the aerobic biological contact unit I so as to be rejuvenated and rendered aerobic by being admixed with an alkaline material and a small quantity of alkaline aerobic sludge from the unit C or E. The effluent from the aerobic contact unit may be discharged with the final effluent of the system or may be conducted to the primary settling tank or pre-aeration unit for recirculation through said system. From the unit I, the sludge is delivered to the reconcentration unit G and then returned to the digesting unit H.

The foregoing description of the invention is explanatory thereof and various changes in the size, shape, and materials, as well as in the details of the illustrated construction may be made, within the scope of the appended claims, without departing from the spirit of the invention.

What I claim and desire to secure by Letters Patent is:

1. The process of treating sewage which includes, separating the solids from the sewage, then treating said solids by anaerobic digestion, and then admixing in the presence of artificial aeration an alkaline material with the anaerobic supernatant resulting from the digestion step so as to reduce said supernatant to an aerobic condition so that it may be returned to the sewage without detrimental effect.

2. The process of treating sewage which includes, separating the solids from the sewage, then treating said solids by anaerobic digestion, admixing an alkaline material with the anaerobic supernatant resulting from the digestion step to raise the pH of its alkalinity, and contacting said supernatant with biological organisms activated by artificial aeration, whereby said supernatant is reduced to an aerobic condition so that it may be returned to the sewage without detrimental effect.

3. A sewage treating process which includes, producing a biologically active sludge from separated solids coagulated and precipitated from the sewage by passing said sewage successively through a plurality of settling and contact chambers, removing the sludge from each chamber and concentrating the same in a reconcentration unit, reducing the concentrated sludge to gases, solids and liquids in a septic digestion unit, and admixing alkaline material with the liquid from the septic digestion unit and contacting said liquid with biological organisms activated by artificial aeration so as to render said liquid aerobic whereby the same may be returned to the sewage without detrimental effect.

CLYDE C. HAYS.

REFERENCES CITED

The following references are of record in the file of this patent:

UNITED STATES PATENTS

| Number | Name | Date |
|---|---|---|
| 1,420,250 | Gavett | June 20, 1922 |
| 1,672,585 | Travers | June 5, 1928 |
| 1,799,444 | Sperr, Jr. | Apr. 7, 1931 |
| 1,936,305 | Leffler | Nov. 21, 1933 |
| 1,982,246 | Fischer | Nov. 27, 1934 |
| 1,997,252 | Fischer | Apr. 9, 1935 |
| 2,077,498 | Streander | Apr. 20, 1937 |
| 2,090,405 | Shook | Aug. 17, 1937 |
| 2,129,267 | Fischer | Sept. 6, 1938 |
| 2,137,966 | Rankin | Nov. 22, 1938 |
| 2,188,162 | Schulhoff | Jan. 23, 1940 |
| 2,190,598 | Fischer | Feb. 13, 1940 |
| 2,221,346 | Durdin | Nov. 12, 1940 |
| 2,228,017 | Pecker | Jan. 7, 1941 |
| Re. 22,144 | Ward | July 21, 1942 |
| 2,317,782 | Levine | Apr. 27, 1943 |
| 2,348,126 | Green | May 2, 1944 |
| 2,349,390 | Tolman | May 23, 1944 |
| 2,359,004 | Schlenz et al. | Sept. 26, 1944 |
| 2,370,974 | Langdon | Mar. 6, 1945 |
| 2,388,795 | Montgomery et al. | Nov. 13, 1945 |
| 2,389,357 | Griffith | Nov. 20, 1945 |